United States Patent
Reavey et al.

[19]

[11] Patent Number: 5,847,698
[45] Date of Patent: Dec. 8, 1998

[54] ELECTRONIC BOOK DEVICE

[75] Inventors: Brian Reavey, Somerset County; Gerald Caffrey, Hunterdon County, both of N.J.

[73] Assignee: DataVentures, Inc., Piscataway, N.J.

[21] Appl. No.: 716,837

[22] Filed: Sep. 17, 1996

[51] Int. Cl.[6] .................................................. C09G 5/00
[52] U.S. Cl. .......................... 345/173; 345/901; 361/681
[58] Field of Search .................................. 345/173, 156, 345/168, 169, 179, 901, 905; 364/708.1; 178/18, 19; 341/22; 361/681, 680, 686

[56] References Cited

U.S. PATENT DOCUMENTS

| | | | |
|---|---|---|---|
| 4,159,417 | 6/1979 | Rubincam | 235/375 |
| 4,160,242 | 7/1979 | Fowler | 340/711 |
| 4,490,811 | 12/1984 | Yianilos | 364/900 |
| 4,757,302 | 7/1988 | Hatskeyama | 340/407 |
| 4,830,618 | 5/1989 | David | 434/169 |
| 4,891,775 | 1/1990 | McWherter | 364/705.06 |
| 4,980,836 | 12/1990 | Carter et al. | 364/200 |
| 5,007,019 | 4/1991 | Squillante | 364/900 |
| 5,049,862 | 9/1991 | Dao et al. | 345/179 |
| 5,113,340 | 5/1992 | McWherter | 364/419 |
| 5,249,965 | 10/1993 | Yianilos | 434/177 |
| 5,339,091 | 8/1994 | Yamazaki et al. | 345/901 |
| 5,467,102 | 11/1995 | Kune et al. | 345/903 |
| 5,475,399 | 12/1995 | Borsuk | 345/901 |
| 5,566,098 | 10/1996 | Lucente et al. | 364/708.1 |
| 5,663,748 | 9/1997 | Huttman et al. | 345/901 |

FOREIGN PATENT DOCUMENTS 0136379  2/1991  United Kingdom .
WO82/03132  9/1982  WIPO .
WO88/09985  12/1988  WIPO .

OTHER PUBLICATIONS

Online Service—Zenith Data Systems Cruise Pad—Pcuser.
Online Service—Magic Link PIC–1000 Communicator.
Online Service—EHT–400S—Epson Products.
Online Service—The Ego—Thompson Consumer Electronics.
Digital Book System—Model DBS–2—Franklin ELectronic Publishers, Inc. Mt. Holly, New Jersey 08060.

*Primary Examiner*—Dennis-Doon Chow
*Attorney, Agent, or Firm*—Kenneth P. Glynn, Esq.

[57] ABSTRACT

An electronic book device has an electronic display unit having a flat panel screen and a housing for containing the flat panel screen. A cover is provided, which is hingedly and electrically connected to the electronic display unit. The housing further has a means for accessing material on a PC card and forwarding the material to the electronic display unit. The housing also has navigation keys for cursering through the material. Activation and deactivation of the electronic display unit is responsive to opening, partially opening and closing of the electronic book device. The device features a means for orientating the material on the electronic display unit responsive to an opening position of the electronic book device. In another embodiment, a data entry mechanism is operatively connected to the electronic display unit. The data entry mechanism can be implemented by using a touchscreen for the electronic display unit. In still another embodiment, a second electronic display unit replaces the cover.

16 Claims, 5 Drawing Sheets

ELECTRONIC BOOK DEVICE

BACKGROUND OF THE INVENTION

1. Field of the Invention

The present invention relates in general to electronic devices for the display and input of text and data. Specifically, the present invention provides a single screen or a hinged dual screen electronic device which can display textual and graphical information stored in various memory cards or compatible media and has an integrated data entry capability. More specifically, the electronic device has a screen orientation function which allows the user to orient and use the device in either a side-by-side fashion, i.e. like a book, or in an over/under fashion, i.e. like a laptop computer.

2. Description of the Prior Art

The following patents describe the state of the art in electronic hand held devices.

U.S. Pat. No. 4,891,775 to McWherter describes an electronic word game version of the game hangman. The device has a memory containing a word list arranged in a tree format and a tree search control module to compare an input word against the tree memory to provide a valid output word. A random number generator generates a random number for each position in the input word size selected. The random number selects from a predetermined letter table which has a frequency distribution equal to the usage in the English language. The result is a selected letter sequence having the proper size, which is then traversed against the memory to find a word.

U.S. Pat. No. 4,490,811 to Yianilos et al. describes a string comparator device for comparison of strings of indicia at high speeds for use in a system circuit in a computer system. The string comparison device provides a numeric measurement of the degree of similarity between the compared indicia strings as defined by a mathematical algorithm.

U.S. Pat. No. 4,830,618 to David describes a hand held electronic spelling machine. A keyboard is provided for entry of the specified word and search results are displayed on a single line display. A scrolling function is provided for viewing the words found.

U.S. Pat. No. 5,007,019 to Squillate et al. describes an electronic dictionary for entering a word and displaying the associated synonyms of the word. A history list is generated which contains user selected words, so as to enable the user to review the words at a later time. This enables the user to track through the history list to explore any desired complex arrangement of concepts, ideas and relationships.

U.S. Pat. No. 5,113,340 to McWherter describes improvements to hand held spelling machines. Specifically, search speed is increased by providing a look up table which encodes all character sets of one or two letters into a coded string.

U.S. Pat. No. 5,249,965 to Yianilos describes an improvement to electronic crossword puzzle solving machines which provides alternative words for an entered word. Initial activation of the search finds all words having only one different letter. Succeeding activations look for 2, 3, and so on different letters than the entered word.

European Patent Office Publication No.: 0 136 379 B1 describes a word comparator for finding numerical similarity between the compared words.

Franklin Electronic Publishers, Inc. has an electronic device, Digital Book System—Model DBS-2 which has a keyboard for data entry and for operational control of the electronic device. It has a five line display and scrolling arrows for viewing the rest of the text. The device has two slots for memory cards.

Zenith Data Systems has a device termed the CruisePAD. It uses a radio device to connect it to and access PC software and hardware which may be 500 feet away. It has a processor, memory, storage, an expansion port and a network connection. It has an operating system and applications and interface devices such as a display, keyboard, mouse and audio equipment. Hot keys are provided for access to basic functions. It can alternatively be connected to a PC via a PCMCIA card.

EPSON has a EHT-400S, which is a small portable system with DOS, Windows and UNIX capabilities. It has a processor, memory, display screen, and two PCMCIA Type III slots (or 4 Type II). It has a resistive film touch panel for input. EHT-400C is a comparable color version.

Sony has the PIC-1000 Communicator which can send and receive electronic mail, faxes and has software for organizing and scheduling. User can create a message on the on-screen keyboard or write in their own handwriting using the stylus. It has an internal data and fax modem, infrared beam communication, one PCMCIA Type II slot and a serial interface port.

U.S. Pat. No. 4,159,417 to David P. Rubincam describes an apparatus which includes a digital memory, a sensor for sensing information from the memory, logic circuitry coupled to the sensor, and a display for visually displaying the stored information. It further includes a portable container for containing the above elements, a control mechanism for controlling what information is displayed and a memory card having a matrix of holograms which contain binary bits of information.

U.S. Pat. No. 4,160,242 to Gerald C. Fowler describes a reading machine which provides a visual display of collected textual material. The device has an addressable memory for storing the textual material and an output means for providing output signals corresponding to the textual material at selected addresses in the memory, a means for addressing the memory and select the desired material, operator means for selecting the material, comparison means for inhibiting further processing when the desired material has been selected, a second memory, a control means for connecting to the first or second memory and a display mechanism for visually showing the selected textual material.

U.S. Pat. No. 4,757,302 to Atsushi Hatakeyama et al, assigned to Hitachi, Ltd., describing an image display device for paging images on a display screen. The device comprises a memory for storing a plurality of page images with image identification numbers, display means for sequentially reading and displaying the page images by successive line scanning with a specified display interval time, display speed control means for specifying the interval time and direction of paging, time measurement means, and means for continuously sampling the display interval time and for comparing a sampled value with elapsed time for controlling the paging.

Thomson Consumer Electronics has a portable self-contained videodisc player and associated screen. The player has a 10" LCD display, a videodisc player, sound and a six hour battery supply.

Notwithstanding the above prior art, it is believed that the device set forth herein is neither taught nor rendered obvious.

SUMMARY AND OBJECTS OF THE INVENTION

The present invention is an electronic book device which combines the look and feel features of a conventional book with state of the art electronic technology. The end result is an electronic book device which features an electronic display unit having a multi-orientatable single flat panel or a hinged dual flat panel display, accessibility to information on memory cards or other such electronic media, an integrated user entry function and an user control function. The panels can display text and graphics in a black and white or color format. Adding to the book look and feel is a protective book-type cover which is designed to reflect the information contained in the device. The present invention provides an aesthetically pleasing, easy to read and use electronic device for reviewing various types of information.

The device can be used in multiple configurations. In the single flat panel embodiment, the device can be used in either a horizontal or a vertical display mode. In the dual flat panel embodiment, the user can select one of three different operational modes. In the first mode, the two flat panels are used side-by-side, i.e. in a standard book like format. In the second book, the panels are in an over-under placement and can function as one panel with text and graphics scrolling downward from one to the other. In the third mode, the panels are in an over-under position, but with the bottom panel as a touch screen for data and text entry. This latter mode is the laptop configuration. The ability to have multiple operational modes is facilitated by having a screen orientation feature which automatically adjusts the text and graphics to the desired mode.

Activation and deactivation is accomplished by the opening and closing of the device, respectively. Upon activation the user can easily page through the information by using the control keys, i.e. four navigation keys and an assistant key. The control keys allow the user to page or scroll through the information. The device has two levels of deactivation, a sleep mode and off. In the sleep mode, when the device is not fully closed, power to the panels is cut off after an user defined amount of time. In both deactivation modes, the device establishes a bookmark at the current page. When re-activated, the device returns to the bookmarked page. Alternatively, the electronic book device may return to a previously set, user defined bookmark. The user accesses this processing through the assistant function key.

The electronic book device uses PCMCIA cards for the storage of pre-recorded information, and writable cards for the entry, storage and playback of user generated text. PCMCIA cards will be generated for a wide range of subject material, including gardening, sports, travel, hobbies and other areas. Each PCMCIA may hold several books or periodicals on a given subject. Furthermore, the device will be able to access information on other systems and the internet. The computer communication links are established either via direct data links (such as serial, parallel or SCSI communication ports) or through modem communications to various "on-line" networks or the internet. The electronic book device will have an operating system which will allow downloading information from various sources, browsing the internet, and various basic functions, including scrolling and paging through the information.

The present invention accomplishes the above functionality and corrects the defects of past devices by providing at least one electronic display unit having a flat panel screen and a housing for containing same. A cover is provided when only one electronic display unit is being used. The electronic display unit is hingedly and electrically connecting to either the second electronic display unit or to the cover. The housing has means for accessing material on a PC card and forwarding the material to the electronic display unit. The housing also has means for navigating through the material on the electronic display unit. The device has means for activation and deactivation which are responsive to opening, partially opening and closing of the electronic book device. The electronic book device features a means for orientating the material on the electronic display unit responsive to an opening position of the electronic book device. The device has a means for conditioning power to all parts of the electronic book device.

The present invention provides a device which has more screen area to depict text and graphics, an adaptive screen orientation function and is easy to use.

BRIEF DESCRIPTION OF THE DRAWINGS

The present invention should be more fully understood when the specification herein is taken in conjunction with the drawings appended thereto, wherein.

DETAILED DESCRIPTION OF THE PRESENT INVENTION

The electronic book device integrates the look and feel familiarity of a book with advanced computer technology to create an easy to use, multi-functional and versatile tool for viewing information in the form of text and graphics. The electronic book device has either a single or a dual screen electronic display. Although the two embodiments may be structurally different, functionality is the same. As such, the structural aspects of the two embodiments are described, followed by the functional description.

Figure 1:
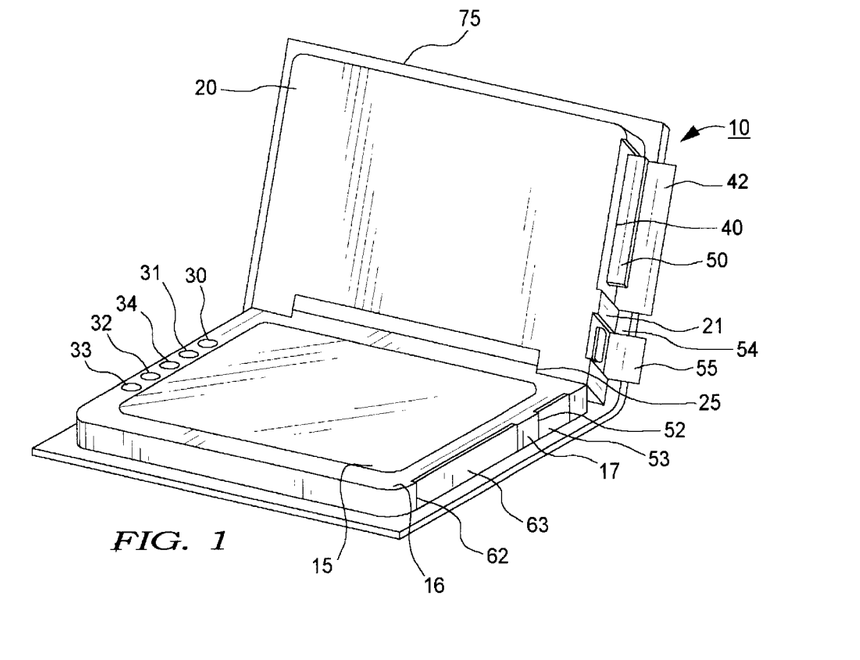
FIG. 1 shows a perspective view of a single panel embodiment of the present invention.

Referring to FIG. 1, the electronic book device is depicted generally as 10. Electronic book device 10 has a single panel screen 15, a housing 16 for single panel screen 15, a front cover 20 and a hinge 25 which electronically connects single panel screen 15 and front cover 20. Housing 16 or front cover 20 will further contain a power conditioner 60 (not shown), which will condition power from a power source 62. Power source 62 may be a rechargeable battery. A set of four navigation keys 30–33 and an assistant key 34 are positioned on an outside surface of housing 16. As explained below, navigation keys 30–33 each have indicia equating to the functionality of the key (refer to FIG. 2). For example, navigation key 30 could be for Fast Reverse and have a << symbol; navigation key 31 could be for Reverse and have a < symbol; navigation key 32 could be for Forward and have a symbol >; navigation key 33 could be for Fast Forward and have a symbol >>; and assistant key 34 could be represented by an □.

A side surface 21 of front cover 16 includes at least one slot 40 for inserting and electrically connecting a PCMCIA (Personal Computer Memory Card International Association) card 50. Side surface 21 further includes an access port for a parallel port 54 for computer communications and printer. A screen side surface 17 of housing 16 contains an access area for power source 62 and a serial port 52 for computer communications and printer. PC Card slot 40, serial port 52, parallel port 54 and power source 62 may additionally each have port covers 42, 53, 55 and 63. Slot cover 42, port covers 53 and 55 and power source cover 63 are shown as hinged covers, but could also be sliding bar covers or any other comparable mechanism.

In addition to allowing users read various types of stored information, users can also create their own works using a data entry mechanism 70. In the single panel embodiment, data entry mechanism 70 can be implemented in two ways, either single panel screen 15 can be a touchscreen or it can be a separate keyboard on front cover 20. If implemented as a touchscreen, data entry mechanism 70 would overlay a portion of single panel screen 15. Touchscreen devices in this sense means any of a number of devices including surface wave touchscreens, resistive membrane touchscreens and capacitive touchscreens. The user created work could then be stored on a PC card 50.

To further enhance the book-like feel, electronic book device 10 will also have a protective book-type cover 75. In addition to protecting electronic book device 10 from wear and tear, protective book-type cover 75 can be embellished with various designs and graphics corresponding to the subject area of interest. As a result, the present invention looks like a book, feels like a book and is as easy to use like a book.

Figure 2:
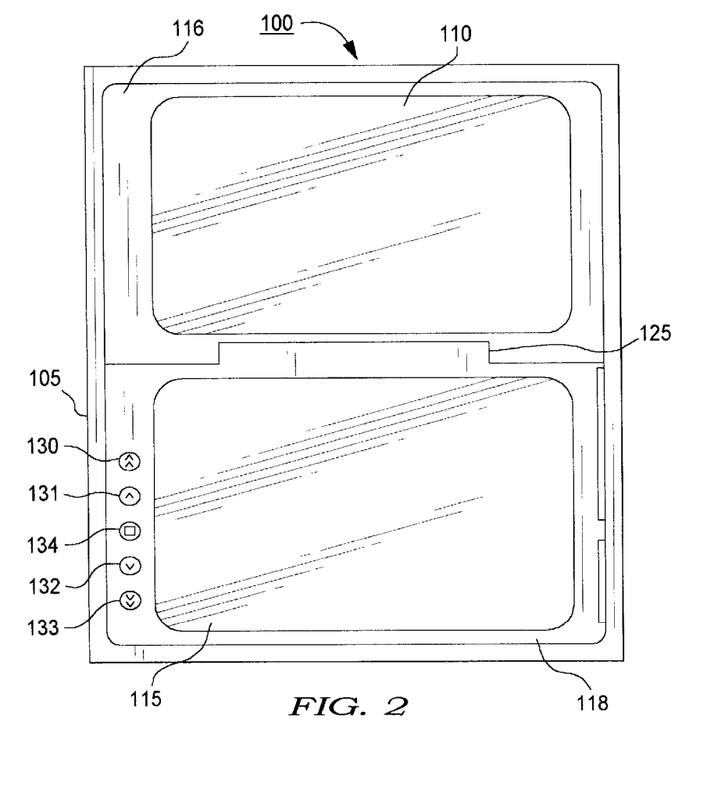
FIG. 2 shows a perspective view of a dual panel embodiment of the present invention.
Figure 3:
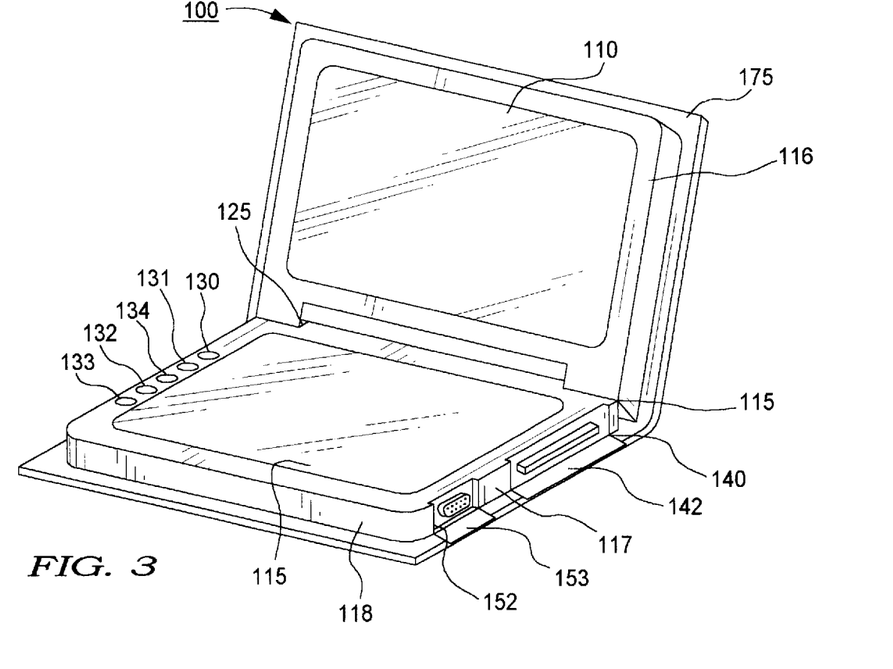
FIG. 3 shows another perspective view of the dual panel embodiment shown in FIG. 2.
Figure 4:
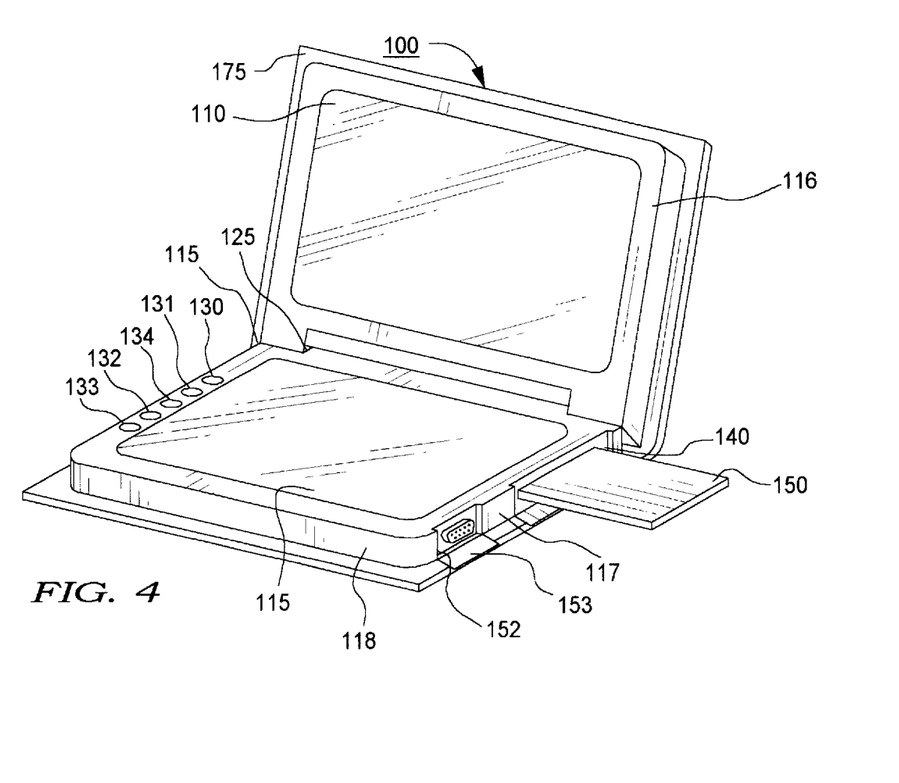
FIG. 4 shows another view of the embodiment shown in FIG. 2.

Referring now to FIGS. 2–4, an electronic book device 100 is depicted with a dual screen display 105. Dual screen display 105 has a first panel screen 110 which is electrically connected to a second panel screen 115 through a hinge 125. First panel screen 110 and second panel screen 115 are contained in housing 116 and 118, respectively. Power conditioner 160 will be contained in either first panel screen 110 or second panel screen 115. Electronic book device 100 will have four navigation keys 130–133 and an assistant key 134 located on an outside surface of on one of first panel screen 110 or second panel screen 115. As before, a side surface 117 will have a slot 140 for a PC card 150 (with cover 142), a serial port 152 (with cover 153) and a parallel port 154 (with cover 155).

In this embodiment a data entry mechanism 170 can be implemented by having either first panel screen 110 or second panel screen 115 as a touchscreen. As before, before a protective book-type cover 175 is used to protect and present an aesthetically pleasing product.

Figure 5:
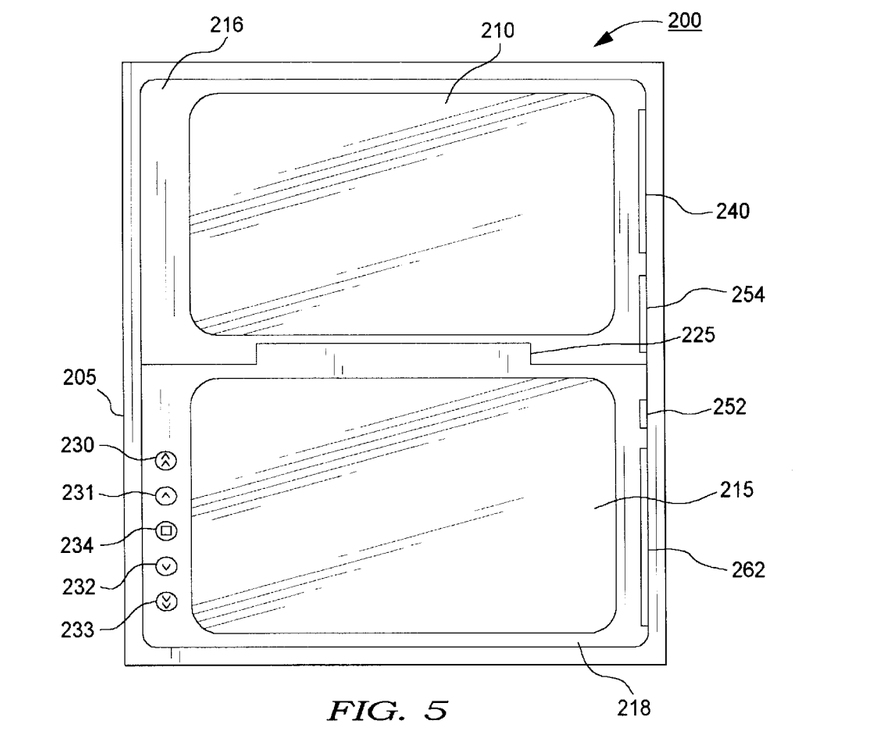
FIG. 5 shows another embodiment of the present invention.
Figure 6:
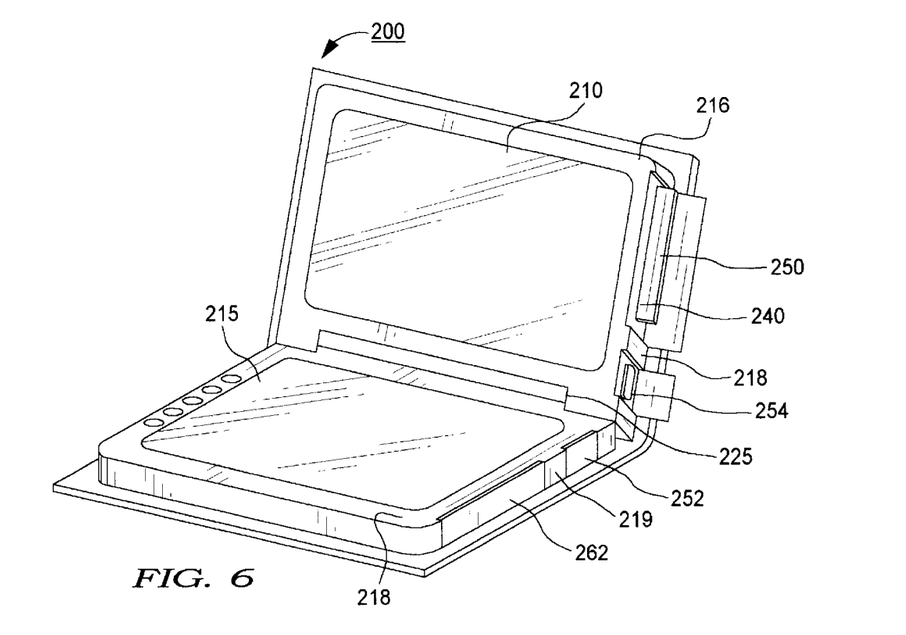
FIG. 6 shows another view of the embodiment shown in FIG. 5.

Referring to FIGS. 5 and 6, another embodiment of the present invention is shown and is indicated generally as 200. Dual screen display 205 has a first panel screen 210 which is electrically connected to a second panel screen 215 through a hinge 225. First panel screen 210 and second panel screen 215 are contained in housing 216 and 218, respectively. Power source 262 will be contained in a second screen side 219. In addition, serial port 252 will also reside in second screen side 219. First screen side 218 contains a slot 240 for a PC card 250 and a parallel port 254. As before, electronic book device 200 will have four navigation keys 230–233 and an assistant key 234 located on an outside surface of second panel screen 215. A data entry mechanism is implemented as discussed above.

Figure 7:
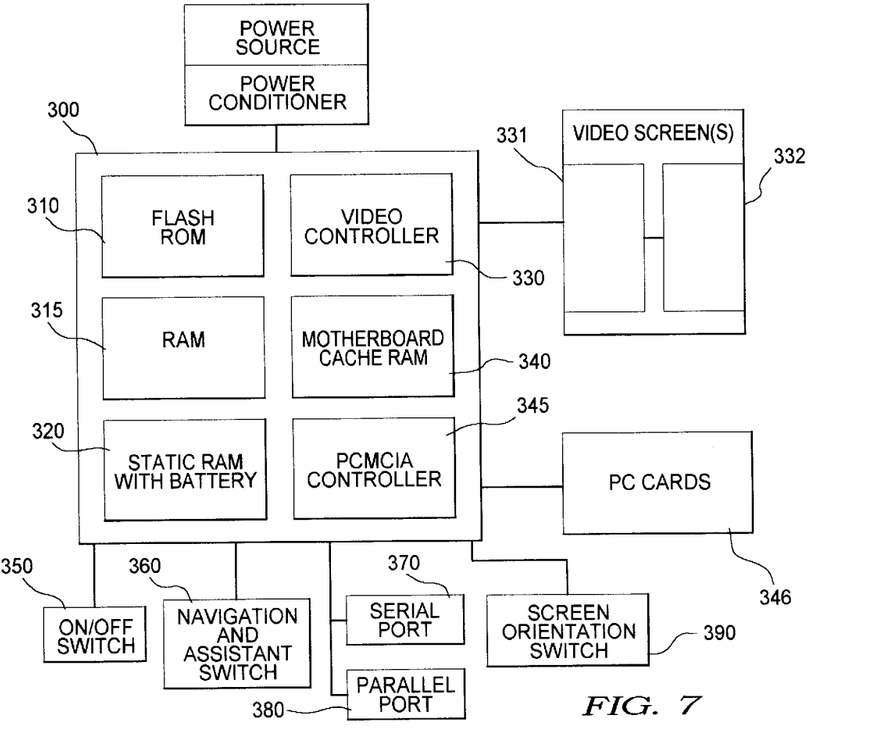
FIG. 7 a high level schematic of the present invention.

Referring now to FIG. 7, a high level schematic of electronic book device 10 and/or 100 (and other embodiments) is shown. The schematic illustrates one method and design of implementing the necessary processing. Electronic book device 100 will be used for reference purposes, but it should be noted that the following is equally applicable to electronic book device 10. Any variations will be noted. In this implementation, electronic book device 100 will consist of a central processing unit (CPU) 300, a read only memory (ROM) 310, a random access memory (RAM) 315, a static RAM with battery 320, a video controller 330, a cache RAM 340 and a PCMCIA controller 345.

ROM 310 will contain the software required by electronic book device 100 and will include but is not limited to the operating system, power management, diagnostics, touchscreen/digitizer software, screen orientation software, PCMCIA card driver software, card reader application software, data entry software and data transfer software. ROM 310 may be of the Flash ROM variety, thus making it available for upgrades. Since ROM 310 cannot be "easily" written to, static RAM with battery 320 is provided to save various user specific parameters, such as communications parameters, user preferences, electronic bookmarks, passwords, parameters for power management. To enhance operation and speed of electronic book device 100, cache RAM 340 is provided which facilitates recovery from sleep mode, scrolling back and forth and other similar associated functions. Video controller 330 and PCMCIA controller 345 contain hardware necessary for operation of video screens 331, 332 and PC cards 346. Serial port processing 370 and parallel port processing 380 facilitate the use of serial port 252 and parallel port 254 for computer communications and/or internet access. An Universal Serial Bus system could also be used to perform the above functionality.

In addition to the above described nominal software and hardware, electronic book device 100 also requires on/off switch processing 350, navigation and assistant switch processing 360 and screen orientation processing 390.

Figure 8:
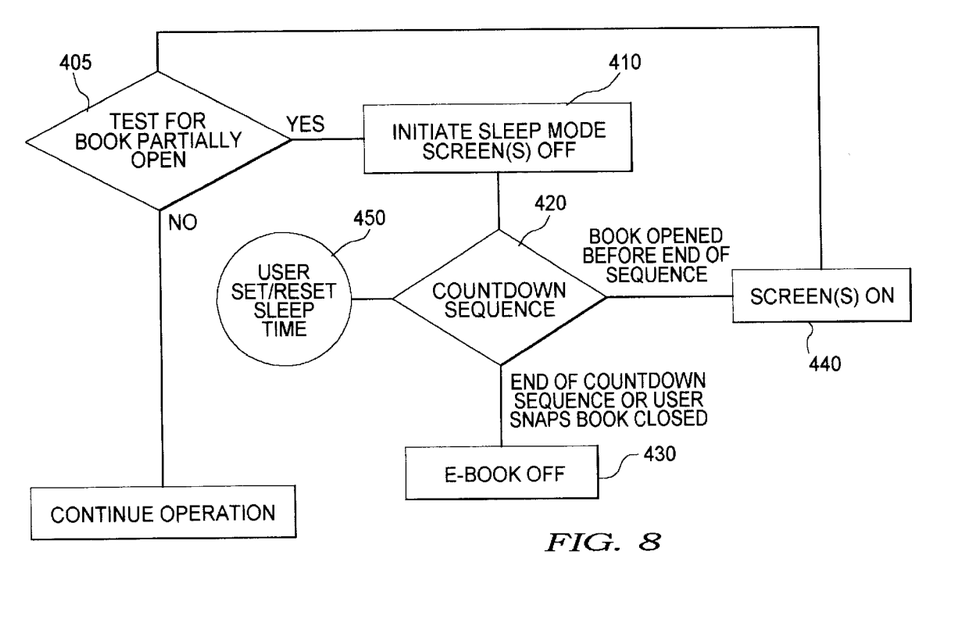
FIG. 8 shows a top level functionality flowchart upon activation of the present invention.

Referring to FIG. 8, on/off switching processing 350 is shown in a flowchart format. On/off switching format 350 is performed at an interrupt level of CPU 300 and as such, it is a continuous background process. Electronic book device 100, in the same manner as a book, is activated and deactivated by simply opening and closing electronic book device 100. Hinge 125 will employ commonly used hinge detents together with on/off switching process 350, i.e. a spring and ball bearing mechanism, to sense if electronic book device 100 is closed, open or partially open. There are two levels of deactivation, sleep mode and off. Off occurs when electronic book device 100 is snapped close and the spring is in a compressed state. Sleep mode occurs when electronic book device 100 is partially open (step 405). When electronic book device is partially open, power to the screens is turned off (step 410). The initiation of sleep mode begins an user definable time-out sequence (step 420). Concurrently, as the power is shut down to the screens, an electronic bookmark is set and stored in static RAM 320. This also occurs when electronic book device 100 is snapped closed. If the countdown sequence ends or the user closes electronic book device 100, electronic book device 100 is turned off (step 430). At this juncture, electronic book device 100 will go into a one minute shut down cycle. If electronic book device 100 is re-opened within the one minute shutdown cycle time, the screen will return as in the sleep mode. If re-opened after the shutdown cycle time, then electronic book device 100 has to go through the full initialization start up cycle. If electronic book device 100 is fully opened before the end of the sequence, then the screens are reactivated with the information displayed prior to when electronic book device 100 went into sleep mode (step 440). If electronic book device 100 is opened after the end of the sequence, then electronic book device 100 must go through the longer initialization start up cycle. However, electronic book device 100 will still return to the bookmarked page(s). During step 420, the user can set/reset the sequence as desired (step 450). As stated earlier, on/off switching processing is a background function and will always check the status of electronic book device 100.

Navigation and assistant switch processing 360 manages the functionality of navigation keys 130–133 and assistant key 134. Navigation keys 130–133 allow the user to advance through pages, chapters, menus etc. Navigation keys 130 and 131 allow the user to return to the beginning of a chapter, the first page of the text or to the previous page, respectively. Navigation keys 132 and 133 allow the user to go forward one page or advance to the end of the document, respectively. Assistant key 134 permits the user to access a special menu of user-definable tasks such as setting and changing bookmarks, go to the table of contents, go to a print menu or go to a communications menu. Process 360 allows the user to perform all basic operational and setup functions.

Electronic book device 100 can automatically rotate text and graphics on the display panel to change the screen orientation. Screen orientation processing 390 in conjunction with commercially available multi-function gravity switches and hinge 125 permit electronic book device 100 to be used in one of three available operational modes, namely, side-by-side, over-under, and over-under with touchscreen keyboard. In a single panel screen embodiment, the side-by-side mode corresponds to having the display screen in a vertical position and in the over-under mode, it corresponds to a horizontal positioning. The over-under mode with keyboard equates to the horizontal position with a touch-screen keyboard. In the dual panel screen embodiment, the side-by-side mode has both screens in the vertical position and in the over-under mode, the screens are both in a horizontal position. The over-under mode with keyboard corresponds to having the top horizontal screen behave as a normal display screen and the bottom horizontal screen behave as a touchscreen keyboard. In the over-under mode, the two screens could act as one screen, with the text and graphics scrolling downward from one to the other.

The modes are set automatically when electronic book device 100 is opened. The mode set being dependent upon the way the user is holding electronic book device 100. If electronic book device 100 is held in a normal book like manner, then mode 1 will be selected and the ensuing text and graphics will appear in a side-by-side manner. If electronic book device 100 is held in an over-under (top-bottom) fashion, i.e. opened in a checkbook manner, then mode 2 will be set. Mode 3 is activated if electronic book device 100 is placed on a flat surface and is partially opened. As stated before, hinge 125 has a spring detent. A detent is set at a predetermined angle, say approximately at 120° open which, when electronic book device 100 is in the proper position, will activate a touchscreen keypad on the bottom screen. Electronic book device 100 is weighted such that it is balanced on a hard surface in this position to permit typing on the keyboard. When electronic book device 100 is fully opened all the way, the keyboard will disappear.

The electronic book device will use PCMCIA (Personal Computer Memory Card International Association) cards for the storage of data and for communication with computers and computer networks. The electronic book device will use at least three types of PC cards: communication cards (modem cards), memory cards and ROM type PC cards for pre-recorded information. The computer communication links are established either via direct data links (such as through serial, parallel or SCSI communication ports) or through modem communications to various "on-line" networks or the internet. Electronic book device 100 will use at least one Type II PCMCIA card (PC card). PC communication cards may be used to allow for high speed communication pathways such as ISDN, ATM, ETHERNET and other similar services.

As stated above, electronic book device 100 will use PC cards to store pre-recorded information storage. In the same manner as books, PC cards will be available in a broad range of subjects. However unlike books, the PC Cards may have enough storage capability to hold several books or periodicals on a given subject. As a consequence, a specific electronic book device can be packaged for a targeted market, such as historians, collectors, gardeners, and other such interest areas. With respect to periodicals or updates to books, the PC cards can be recycled and exchanged for a new electronic edition of the subject area. The memory cards can be used by users to capture, store and playback pages of information that was either downloaded or created by the user.

The operating system software will allow downloading information from various sources, browsing the internet, and various basic functions, including scrolling and paging through the information. The software will allow any type of computer to download pages of information to PC cards in the electronic book device for future reading. As stated, this can be done either directly through a computer having a PCMCIA adapter or a by connecting through a standard communication link. The operating software will also include internet browser software. This can be used in tandem with the touchscreen to try to locate web sites of interest and store the associated information.

Both the single screen panel and the dual screen panel configurations provide greater screen area and greater flexibility in user operation. The display panels will support VGA resolution text and graphics using a subset of the standard operating system.

Figure 9:
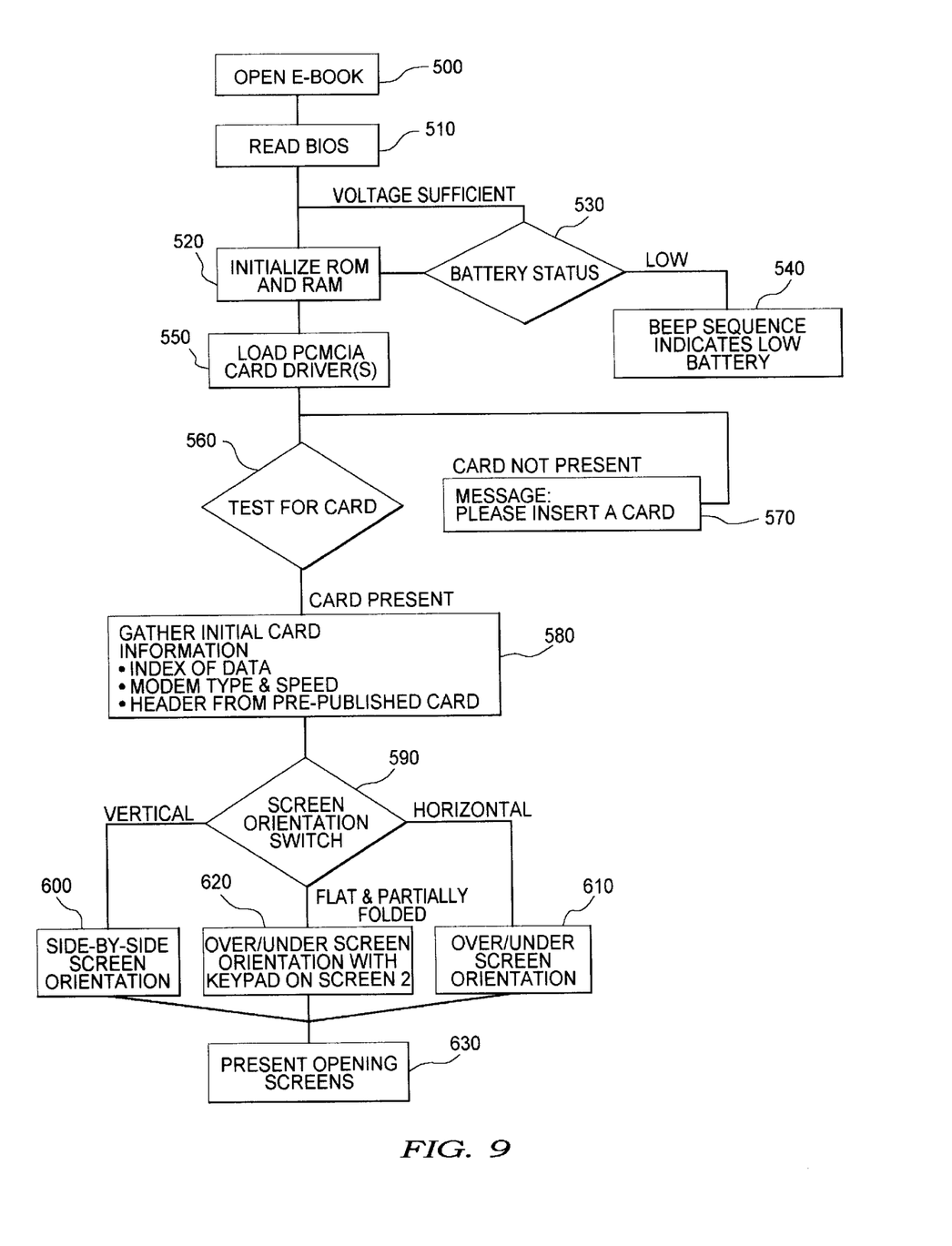
FIG. 9 shows an interrupt level functionality for the present device.

Referring now to FIG. 9, electronic book device 100 (and other embodiments) will operate basically as shown in the flowchart. Activation of electronic book device is accomplished by simply opening device 100 (step 500). This results in reading the BIOS program (step 510) and initializing ROM and RAM (step 520). Concurrently, the status of the battery is checked (step 530). If battery power is low, a beep sequence is initiated (step 540).

The next set of steps determine and gather information related to the PC card. First, the PCMCIA card driver software is loaded (step 550). Next, a determination is made as to whether a PC card has been inserted into electronic book device 100 (step 560). If no card is present, a message is relayed to the user to insert a PC card (step 570). If a card is present, information regarding the card is gathered. This includes an index of the data, modem type and speed (if needed) and any header information from a pre-published card (step 580).

The next block determines what is the proper mode of electronic book device (step 590). Screen orientation processing 390 will determine if electronic book device 100 should be in mode 1 (step 600) or mode 2 (step 610) or mode 3 (step 620). Once this has been determined, then the opening screens are presented to the user. Prerecorded books on PC cards will present their own opening screens and menus informing the user on how to proceed. If a recordable type PC card is detected, the user will be presented with a menu of options including but not limited to the following: Read a Book; Read Pages; Record Pages; and Create a Book. When the user is done with electronic book device 100, an electronic bookmark is placed at the last open page.

Obviously, numerous modifications and variations of the present invention are possible in light of the above teachings. It is therefore understood that within the scope of the appended claims, the invention may be practiced otherwise than as specifically described herein.

What is claimed is:

1. An electronic book device, which comprises:
   a) an electronic display unit having a flat panel screen and a housing for containing said flat panel screen;
   b) a cover and a means for hingedly and electrically connecting said cover to said electronic display unit;
   c) said housing having means for accessing material on a PC card and forwarding said material to said electronic display unit;
   d) said housing having means for navigating through said material on said electronic display unit;
   e) means for activation and deactivation of said electronic display unit responsive to opening, partially opening, partially closing and closing of said electronic book device; said means for activation and deactivation being responsive to a detent in said hinge means, said detent indicating a relation between said electronic display unit and said cover;
   f) means for orientating said material on said electronic display unit responsive to an opening position of said electronic book device; and,
   g) means for conditioning power to said electronic book device.

2. The electronic book device of claim 1, wherein said means for orientating further includes means for determining said opening position by using a multi-function gravity switch in combination with said detent in said hinge.

3. The electronic book device of claim 2, wherein said electronic book device further includes means for communicating with external devices to obtain other material.

4. The electronic book device of claim 3, wherein said electronic book device further includes:
   a data entry mechanism, said data entry mechanism being operatively connected to said electronic display unit.

5. The electronic book device of claim 4, wherein said data entry mechanism is implemented by having said electronic display unit being a touchscreen.

6. The electronic book device of claim 4, wherein said data entry mechanism is a keyboard pad.

7. The electronic book device of claim 1, wherein said electronic book device further includes:
   a) a data entry mechanism, said data entry mechanism being operatively connected to said electronic display unit.

8. The electronic book device of claim 7, wherein said means for navigating further includes:
   a) a plurality of navigation keys designed to retreat and advance through said material; and
   b) an assistant key for facilitating the setting of user defined parameters and accessing specialized menus.

9. The electronic book device of claim 8, wherein said means for activation and deactivation further includes:
   a) means for setting an electronic bookmark when said electronic display unit is deactivated, said means for setting an electronic bookmark being responsive to said detent in said hinge; and,
   b) means for initiating a sleep mode responsive to said detent in said hinge, said detent indicating a relation between said electronic display unit and said cover.

10. The electronic book device of claim 9, wherein said electronic book device has an outer protective cover.

11. The electronic book device of claim 1, wherein said cover is a second electronic display unit.

12. The electronic book device of claim 11, wherein said electronic book device further includes:
    a data entry mechanism, said data entry mechanism being operatively connected to one of said electronic display unit and said second electronic display unit.

13. The electronic book device of claim 12, wherein said data entry mechanism is implemented by having said one being a touchscreen.

14. The electronic book device of claim 13, wherein when said electronic book device is laid flat on a surface and said electronic display unit and said second electronic display unit are at a predetermined angle as indicated by said detent, said means for orientating orientates said material in an over-under horizontal configuration accompanied by activation of said touchscreen as said data entry mechanism.

15. The electronic book device of claim 11, wherein when said electronic book device is opened in a normal booklike manner, said means for orientating orientates said material in a side-by-side vertical configuration.

16. The electronic book device of claim 11, wherein when said electronic book device is opened in a checkbook manner, said means for orientating orientates said material in an over-under horizontal configuration.

* * * * *